2,951,869

TETRAMETHYLAMMONIUM OZONATE AND METHOD FOR ITS MANUFACTURE

Irvine J. Solomon, Andrew J. Kacmarek, and Kiyoshi Hattori, all of Chicago, Ill., assignors to Armour Research Foundation of Illinois Institute of Technology, Chicago, Ill., a corporation of Illinois No Drawing. Filed May 28, 1958, Ser. No. 738,265

4 Claims. (Cl. 260—567.6)

The instant invention relates to a novel composition of matter, tetramethylammonium ozonate, $N(CH_3)_4O_3$, and the method of its manufacture.

A primary object of the instant invention is to provide tetramethylammonium ozonate as a new composition of matter.

Another object of the instant invention is to provide a method whereby such novel compound may be readily produced.

A further, more specific object of our invention is to provide a method of preparing tetramethylammonium ozonate by the ozonolysis of substantially anhydrous tetramethylammonium hydroxide.

Other objects, features and advantages of our invention will be evident to those skilled in the art to which it most closely pertains from the following detailed disclosure thereof.

Tetramethylammonium ozonate is useful as an oxidizing agent, as a readily decomposable compound to yield oxygen, and also as a raw material reactant in the preparation of alkali metal and other metal ozonates. Its former uses stem from its reactivity as an oxidizer and its ease of decomposition whereas the latter use may be seen from the following general equation:

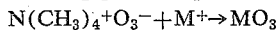

where M+ is a metal ion.

Processwise, our invention is directed to the method whereby the ozonate ion ($O_3^-$) is caused to chemically combine with the tetramethylammonium radical, $N(CH_3)_4^+$. With this requirement in view it is necessary to provide a source of either ozone per se, or the ozonate ion, and a source of the tetramethylammonium radical, the details of which process are fully presented in the paragraphs following.

At the onset it should be clearly understood that the tetramethylammonium hydroxide which is subjected to ozonolysis by dilute gaseous ozone must be substantially anhydrous if the tetramethylammonium ozonate so produced is to remain stable. It also should be understood that after the tetramethylammonium ozonate has been formed it must be stored in a substantially anhydrous environment to prevent it from decomposing.

In discussing the instant invention, the term "dilute gaseous ozone" is used to describe the ozone concentration used in the instant reaction. By this is meant a concentration of from 3% to 10% pure ozone in an inert environment, i.e., an environment inert with respect to the hydroxide reactant and the tetramethylammonium ozonate resulting from the reaction. It is feasible to carry the ozone, for example, in pure oxygen, water-free air, helium, argon, nitrogen, or a multitude of other gases which are non-reactive with our overall system.

Our preferred method of producing tetramethylammonium ozonate is by the ozonolysis of anhydrous tetramethylammonium hydroxide with dilute gaseous ozone, in accord with the following reaction:

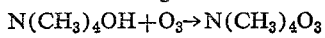

Since commercially available $N(CH_3)_4OH$ consists of a 10% aqueous solution it is first necessary to remove the water therefrom prior to ozonozation. This may be readily accomplished by vacuum pumping or the like. The dried crystals resulting from such procedure are then stored over phosphorus pentoxide until used.

In our procedure such dried hydroxide crystals, in the form of a porous mass, are placed in a closed system and dilute gaseous ozone passed therethrough. The reaction yields solid, red-colored, crystals of tetramethylammonium ozonate and small quantities of water.

By way of example, we passed dilute gaseous ozone through 5 grams of anhydrous $N(CH_3)_4OH$ maintained at 0° C. for 15 minutes to produce 1 gram of $N(CH_3)_4O_3$.

The red crystals were separated from the remaining $N(CH_3)_4OH$ mass and were found to be extremely stable at room temperature, provided that storage thereof was in a moisture-free atmosphere.

We also found that ozonolysis by dilute gaseous ozone could proceed at room temperature provided that the reaction vessel was vibrated during the bubbling procedure in order to minimize the production of local active hotspots.

It will be evident to those skilled in this art that in separating tetramethylammonium ozonate from its tetramethylammonium hydroxide environment by essentially manual means it is extremely difficult and troublesome to prevent the ozonate from contacting, however, briefly, moisture-bearing air. In order to overcome such difficulty we developed several extraction techniques which permit the ready isolation of anhydrous $N(CH_3)_4O_3$. One such technique is to extract the ozonate from the hydroxide by passing liquid ammonia through the system, collecting the solution and then pumping off the liquid ammonia to yield pure $N(CH_3)_4O_3$ crystals.

Another such extraction procedure, which is part of our preferred process, is to first extract the tetramethylammonium hydroxide-tetramethylammonium ozonate mixture with methylamine in order to remove all of the water from the system. Following such extraction liquid ammonia is passed through the system to pick up the tetramethylammonium ozonate and such solution is then pumped to dryness to leave the tetramethylammonium ozonate crystals.

Electronparamagnetic resonance studies of the tetramethylammonium ozonate conclusively show that it contains an unpaired electron characteristic of the ozonate ion thus indicating that the compound is paramagnetic and a free radical. The electronparamagnetic spectrum discloses that such compound has a g value of 2.012 in a width between inflection points of 55 oersteds. From such data it may be conclusively stated the postulated structure of such novel compound is $(CH_3)_4NO_3$.

It should be clearly understood that modifications and variations may be effected without departing from the spirit and scope of our invention.

We claim as our invention:

1. As a new composition of matter, tetramethylammonium ozonate.

2. The method of making tetramethylammonium ozonate which comprises the steps of: passing dilute gaseous ozone through substantially anhydrous tetramethylammonium hydroxide maintained at a temperature below 35° C.; extracting the tetramethylammonium ozonate so produced by passing liquid ammonia therethrough, and separating the liquid ammonia from the crystalline tetramethylammonium ozonate therein by pumping off such liquid ammonia.

3. The method of making tetramethylammonium ozonate which comprises the steps of: passing dilute gaseous ozone through substantially anhydrous tetramethylammonium hydroxide maintained at a temperature below 35° C.; removing the water from the tetramethylammonium hydroxide-tetramethylammonium ozonate system; extracting the tretramethylammonium ozonate by passing liquid ammonia therethrough, and separating the liquid ammonia from the crystalline tetramethylammonium ozonate therein by pumping off such liquid ammonia.

4. The method of claim 3 wherein water is removed from the hydroxide-ozonate system by passing methylamine therethrough.

References Cited in the file of this patent

Strecker et al.: Berichte der Deut. Chem. Gesell., vol. 54B, pp. 2704–2707 (1921).

Strecker et al.: Berichte der Deut. Chem. Gesell., vol. 53, pp. 2100; 2102, 2107–8; 2112–13 (1920).